United States Patent
Asthana et al.

(10) Patent No.: US 10,706,245 B2
(45) Date of Patent: Jul. 7, 2020

(54) LINK ASSOCIATION

(71) Applicant: HEWLETT-PACKARD DEVELOPMENT COMPANY, L.P., Houston, TX (US)

(72) Inventors: Prashant Asthana, Bangalore (IN); Rajesh Bhatia, Bangalore (IN); Amrendra Kumar, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 218 days.

(21) Appl. No.: 15/747,869

(22) PCT Filed: Oct. 6, 2016

(86) PCT No.: PCT/US2016/055628
§ 371 (c)(1),
(2) Date: Jan. 26, 2018

(87) PCT Pub. No.: WO2017/083031
PCT Pub. Date: May 18, 2017

(65) Prior Publication Data
US 2018/0218186 A1    Aug. 2, 2018

(30) Foreign Application Priority Data

Nov. 15, 2015 (IN) .......................... 5996/CHE/2015

(51) Int. Cl.
*G06K 7/10* (2006.01)
*G06K 7/14* (2006.01)
*G06Q 30/02* (2012.01)

(52) U.S. Cl.
CPC ....... *G06K 7/10722* (2013.01); *G06K 7/1413* (2013.01); *G06K 7/1417* (2013.01); *G06Q 30/02* (2013.01)

(58) Field of Classification Search
CPC ............. G06K 7/10722; G06K 7/1417; G06K 7/1413; G06K 7/10
See application file for complete search history.

(56) References Cited

U.S. PATENT DOCUMENTS

| 5,710,417 | A | * | 1/1998 | Joseph | ............... | G06K 7/10584 |
| | | | | | | 235/462.11 |
| 5,920,062 | A | * | 7/1999 | Williams | ............. | G06K 7/1434 |
| | | | | | | 235/462.08 |

(Continued)

FOREIGN PATENT DOCUMENTS

WO    WO2012075418 A1    6/2012

OTHER PUBLICATIONS

Haider, et al. Simultaneous detection of randomly arranged multiple barcodes using time division multiplexing technique, Proc. of SPIE vol. 7546, 754632, 2010.

*Primary Examiner* — Daniel I Walsh
(74) *Attorney, Agent, or Firm* — HP Inc. Patent Department

(57) ABSTRACT

Examples disclosed herein relate to capturing a first machine-readable link via art image capture device, retrieving a first content element associated with the first machine-readable Sink, determining whether the first content element is related to a second content element associated with a second machine-readable link, and in response to determining that the first content element is related to the second content element associated with a second machine-readable link, retrieving the second content element.

20 Claims, 4 Drawing Sheets

(56) References Cited

U.S. PATENT DOCUMENTS

| | | | | |
|---|---|---|---|---|
| 6,045,048 A * | 4/2000 | Wilz, Sr. | G06F 17/30879 | 235/375 |
| 6,102,289 A * | 8/2000 | Gabrielson | G06K 19/06037 | 235/462.01 |
| 7,108,170 B2 * | 9/2006 | McQueen | G06K 7/10861 | 235/375 |
| 7,441,706 B1 | 10/2008 | Schuessler et al. | | |
| 8,282,002 B2 | 10/2012 | Shams | | |
| 8,752,758 B1 * | 6/2014 | Klebe | G01G 23/3707 | 235/375 |
| 9,767,207 B1 * | 9/2017 | Timmermans | G06F 7/36 | |
| 10,244,349 B1 * | 3/2019 | Kaiser | H04W 4/021 | |
| 2001/0045461 A1 * | 11/2001 | Schuessler | G06K 7/14 | 235/462.07 |
| 2002/0170970 A1 * | 11/2002 | Ehrhart | G06K 7/10851 | 235/462.41 |
| 2003/0080191 A1 * | 5/2003 | Lubow | G06K 1/121 | 235/462.01 |
| 2003/0089775 A1 * | 5/2003 | Yeakley | G06K 7/10851 | 235/454 |
| 2003/0094494 A1 * | 5/2003 | Blanford | G06K 7/14 | 235/462.07 |
| 2005/0199724 A1 * | 9/2005 | Lubow | G06K 7/1434 | 235/462.01 |
| 2005/0246237 A1 * | 11/2005 | Hudetz | G06F 17/30879 | 705/26.61 |
| 2008/0169352 A1 * | 7/2008 | Harris | G06K 19/06028 | 235/494 |
| 2010/0217663 A1 * | 8/2010 | Ramer | G06F 17/30867 | 705/14.42 |
| 2010/0301115 A1 * | 12/2010 | Berkun | G06Q 10/00 | 235/380 |
| 2012/0138671 A1 * | 6/2012 | Gaede | G06Q 20/32 | 235/375 |
| 2012/0190386 A1 | 7/2012 | Anderson | | |
| 2012/0205436 A1 | 8/2012 | Thomas et al. | | |
| 2012/0211567 A1 * | 8/2012 | Herzig | G06K 7/1093 | 235/488 |
| 2012/0223131 A1 * | 9/2012 | Lim | G06Q 30/02 | 235/375 |
| 2016/0027042 A1 * | 1/2016 | Heeter | G06Q 30/0248 | 705/14.47 |
| 2016/0162592 A1 * | 6/2016 | Li | G06F 16/955 | 235/375 |
| 2016/0232437 A1 * | 8/2016 | Glaser | G06K 19/0727 | |
| 2018/0218186 A1 * | 8/2018 | Asthana | G06Q 30/02 | |
| 2019/0095861 A1 * | 3/2019 | Baldwin | G06Q 10/0838 | |

* cited by examiner

*FIG. 2A*

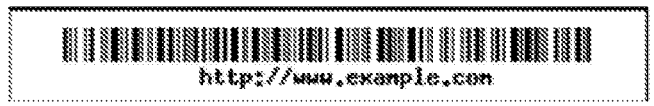

*FIG. 2B*

"Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum."

http://www.example.com

*FIG. 2C*

LINK ASSOCIATION

BACKGROUND

A machine-readable code may comprise encoded information for accessing additional content via a communication network. These codes, such as a bar code, matrix code, watermark, etc., may be associated with links to web sites, documents, images, audio/video files, and/or other types of digital content.

BRIEF DESCRIPTION OF THE DRAWINGS

In the accompanying drawings, like numerals refer to like components or blocks. The following detailed description references the drawings, wherein;

FIGS. 2A-2C are illustrations of example machine-readable links;

DETAILED DESCRIPTION

A link may comprise a machine-readable code, such as a watermark, matrix code, bar code, image fingerprint, etc. Such links may be printed and/or displayed on electronic displays to be made available for scanning by other devices. For example, a person may use a smart phone with a camera to scan a two-dimensional bar code link on a restaurant's menu. The link may be used to retrieve additional content such as a digital copy of the menu and/or a list of daily specials. For another example, a person may be reading a printed document such as a tour guide. Some images in the tour guide may include a watermark that, when scanned, may link to additional content such as descriptions of attractions, coupons for tickets, maps, etc.

In some situations, users may prefer not to have to open an app on their device to scan a link, and/or may not want to scan several related links. For example, scanning each watermark in a tour guide may be considered monotonous and/or tiring for some users; additionally, the repeated use of the camera may represent an unfavorable drain on the device's battery.

In some implementations, the user's involvement may be reduced by using related link information, leveraging past behaviors of the user, and/or aggregating the experience and behaviors across multiple users. For example, upon scanning one watermarked image in a tour guide, the content linked by other watermarked images in the tour guide may be retrieved automatically. For another example, upon scanning a bar code at one display in a store, content linked by bar codes elsewhere in the store may also be retrieved. For a third example, upon scanning a link for a menu, content associated with other menus in a nearby area may also be retrieved and listed.

Figure 1:
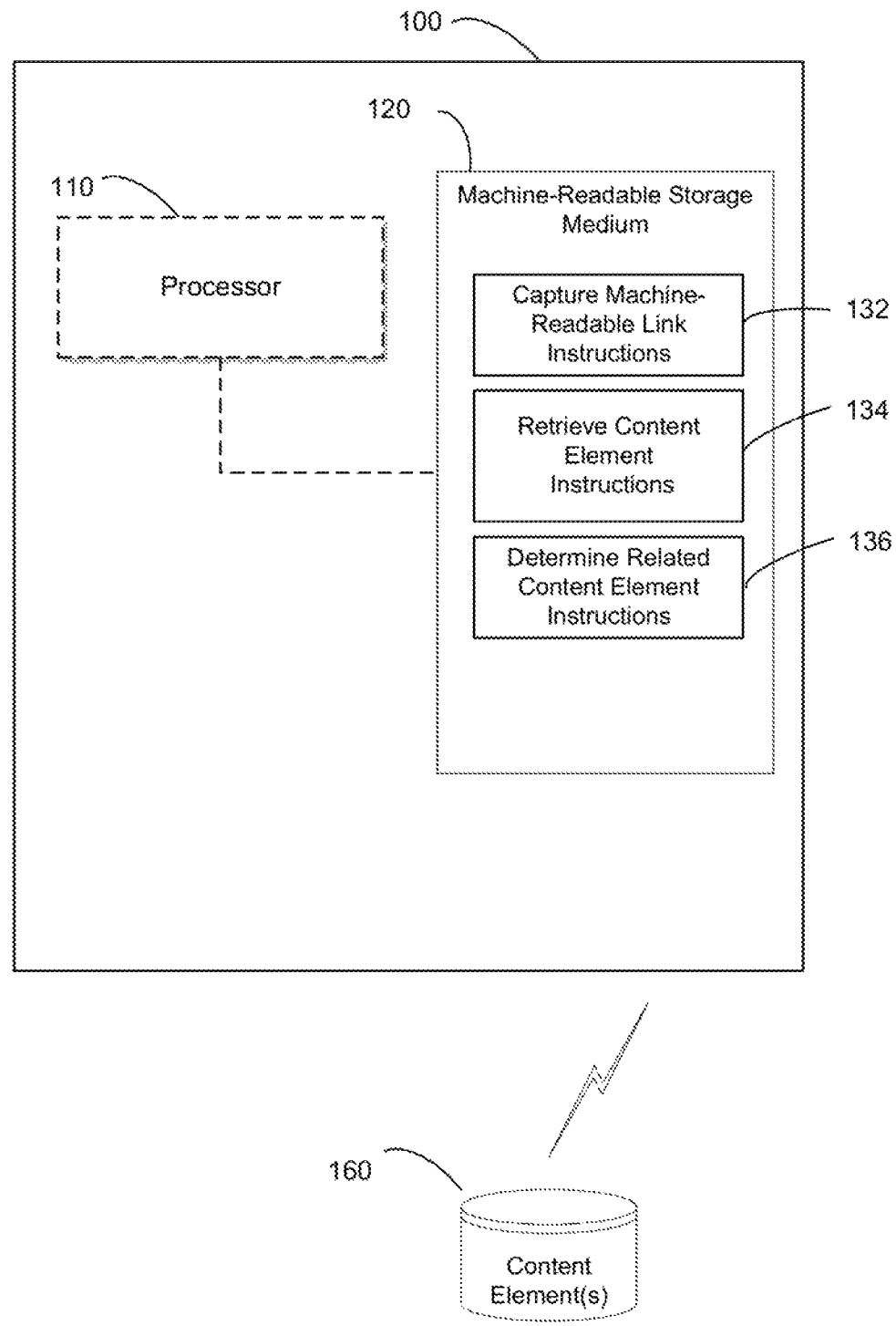
FIG. 1 is a block diagram of an example link association device.

Referring now to the drawings, FIG. 1 is a block diagram of an example link association device 100 consistent with disclosed implementations. Link association device 100 may comprise a processor 110 and a non-transitory machine-readable storage medium 120. Link association device 100 may comprise a computing device such as a server computer, a desktop computer, a laptop computer, a handheld computing device, a smart phone, a tablet computing device, a mobile phone, a network device (e.g., a switch and/or router), or the like.

Processor 110 may comprise a central processing unit (CPU), a semiconductor-based microprocessor, a programmable component such as a complex programmable logic device (CPLD) and/or field-programmable gate array (FPGA), or any other hardware device suitable for retrieval and execution of instructions stored in machine-readable storage medium 120. In particular, processor 110 may fetch, decode, and execute a plurality of capture machine-readable link instructions 132, retrieve content element instructions 134, and determine related content element instructions 136 to implement the functionality described in detail below.

Executable instructions may comprise logic stored in any portion and/or component of machine-readable storage medium 120 and executable by processor 110. The machine-readable storage medium 120 may comprise both volatile and/or nonvolatile memory and data storage components. Volatile components are those that do not retain data values upon loss of power. Nonvolatile components are those that retain data upon a loss of power.

The machine-readable storage medium 120 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Capture machine-readable link instructions 132 may capture a first machine-readable link via an image capture device. For example, device 100 may use an image capture component, such as a camera, to scan a machine-readable link such as a bar code, watermark, matrix code, and/or text link. Such a link may be displayed on a printout, flyer, billboard, digital display, etc. and may provide a way for a user to retrieve additional information.

Retrieve content element instructions 134 may retrieve a first content element associated with the first machine-readable link. The machine-readable link may be translated into encoded information, instructions, and/or a network address and content element identifier for retrieving additional content. For example, the link may be translated into a digital content element such as a vCard and/or may comprise a link to an image or file on a web server. Additionally, retrieve content element instructions 134 may retrieve metadata parameters associated with the link and/or the associated digital content element, such as target user demographics for the content element, a geographic location for the displayed machine-readable link, historical usage/scanning data such as times of day and frequency of scanning, and/or descriptive and/or category tags. Retrieve content element instructions 134 may also, in response to determining, by the determine related content element instructions 136, that the first content element is related to the second content element associated with a second machine-readable link, retrieve the second content element.

Determine related content element instructions 136 may determine whether the first content element is related to a second content element associated with a second machine-readable link. For example, links may be designated as part of a link set and thereby related when the machine-readable links are created. In some implementations, only links that have been designated as public and/or associated with an access credential of the scanning device (or a user thereof) may be considered as related.

In various implementations, determine related content instructions 136 may determine whether the first content element is displayed within a threshold distance of the second content element, whether the first content element and the second content element are each associated with a same document, whether the first content element and the second content element have been previously captured by a second image capture device, whether the first content element and the second content element are each classified into a same category, and/or whether the first content element and the second content element are each associated with a demographic category of a user of the image capture device. For example, when a machine-readable link is created and/or scanned, various parameters such as geo location, time, historic scan data, etc. may be analyzed, grouped and stored in a related link database, such as content element(s) database 160.

A link may be categorized based on various parameters, such as tags, sets, geo-location, and/or time, number, and/or frequency of scans. For tags, a link creator may specify category tags associated with the link. These tags will help in grouping the links based on the user interest and other parameters. For sets, a link creator may create a set of related links and associate related links with the set. A link associated with a geo-location parameter may indicate at which geographic location(s) the link has been scanned. If the same link is scanned multiple times at the same geo-location region then it may be assumed that the link is associated with that location. The example usage of this parameter is at public places like restaurants, movie theaters, etc.

For an example of geo-location, a user may be at a pizza restaurant. The user looks at the restaurant menu card that may display a machine-readable link to some additional information. The user may wish to retrieve the additional digital, content, and so may open a link-scanning app on device 100. Instead of needing to actually scan the machine-readable link, however, the content may be determined to be related to the user's location and the app may automatically display the content from the menu card link even without ever being scanned. In some implementations, scanning the machine-readable link may also retrieve geographically related content from other machine-readable links, such as scanning a link for a menu and receiving both the menu, a list of daily specials, and showtimes for a theater next door.

In some implementations, links may be related based on parameters such as time, number, or frequency of scans. For example, newspaper links may be scanned in the morning and thus can be grouped to be recommended to users who have scanned the similar links previously. A number of scans of a link may be used to determine a weight/importance of a link: the higher the weight of the link, the higher the position that link may be displayed in a list of links. A user category parameter may be used to associate a link with a category and/or demographic of a user. For example, if a particular link is mostly scanned by young children user group then the link may be related to links to content for children users.

FIGS. 2A-2C are illustrations of example machine-readable links. These Figures are provided as examples only and other machine-readable links may comprise any type of display that encodes information into a format translatable into a link and/or instructions for retrieving digital content by an image capture device such as device 100.

FIG. 2A is an illustration of an example matrix code comprising a link to a website.

FIG. 2B is an illustration of an example bar code comprising a link to a website.

FIG. 2C is an illustration of an example watermark comprising a link to a website.

Figure 3:
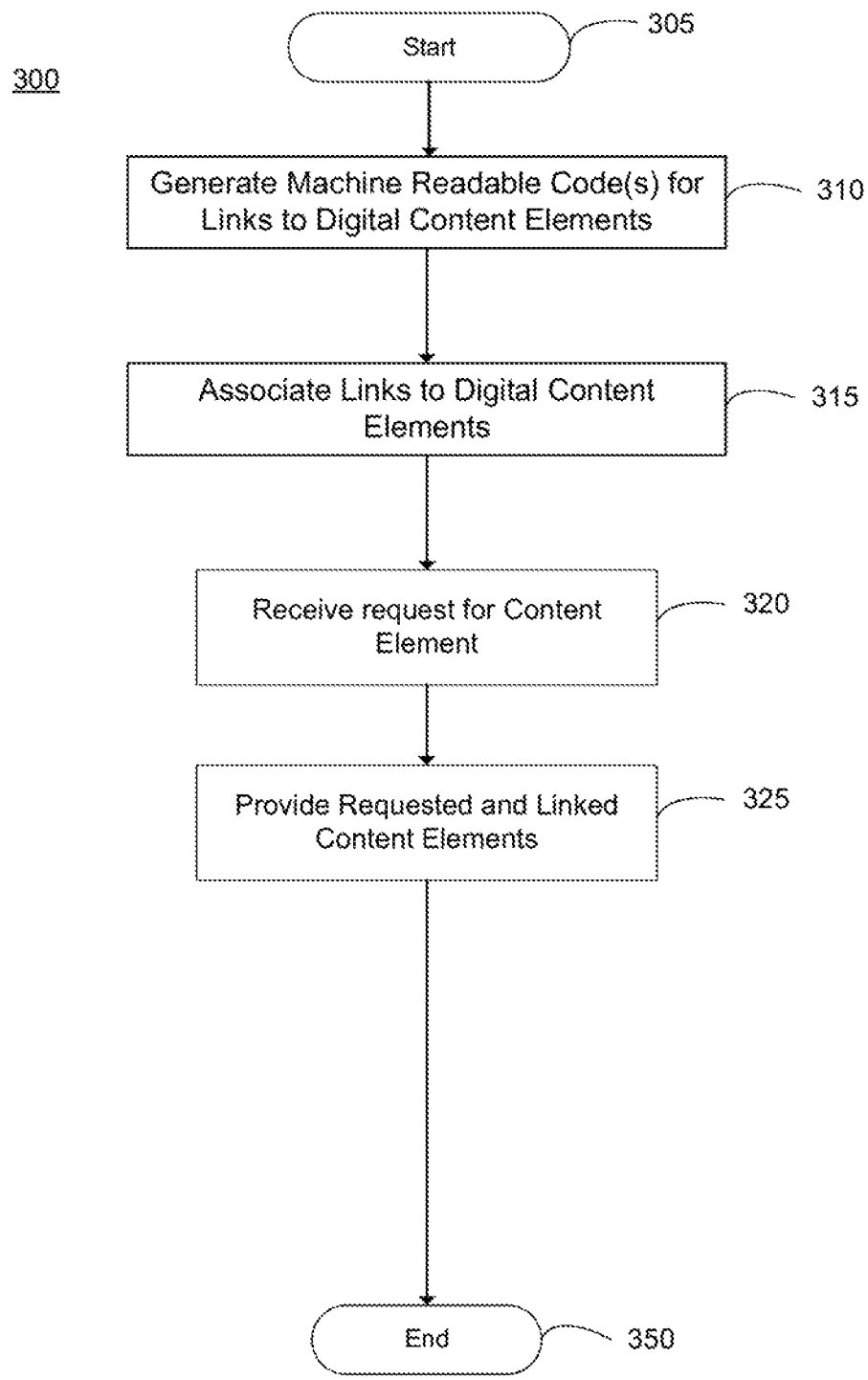
FIG. 3 is a flowchart of an example of a method for providing link association.

FIG. 3 is a flowchart of an example method 300 for providing link associations consistent with disclosed implementations. Although execution of method 300 is described below with reference to the components of device 100, other suitable components for execution of method 300 may be used.

Method 300 may begin in stage 305 and proceed to stage 310 where device 100 may generate a first machine-readable link to a first digital content element. For example, instructions for retrieving the content element, such as a network location, may be encoded into a form that may be displayed such as in the examples of FIGS. 2A-2C.

Method 300 may then advance to stage 315 where device 100 may associate the first machine-readable link with a second machine-readable link to a second digital content element. In some implementations, associating the first machine-readable link with the second machine-readable link may comprise assigning a common tag to the first machine-readable link and the second machine-readable link, associating the first machine-readable link with the second machine-readable link, assigning a common tag to the first machine-readable link and the second machine-readable link, determining that the first machine-readable link and the second machine-readable link have been scanned within a threshold time of each other, and/or determining that the first machine-readable link and the second machine-readable link have been scanned by a plurality of users sharing a demographic characteristic.

Method 300 may then advance to stage 320 where device 100 may receive a request for the first digital content element from an image-capture device can of the first machine-readable link. For example, a user may use a device equipped with a camera, such as a smartphone, to scan the machine-readable link. An app may translate the link into a network location from which the content may be requested.

Method 300 may then advance to stage 325 where device 100 may, in response to determining that the first machine-readable link has been scanned by the image capture device, provide the first digital content element and the associated second digital content element to the image capture device. For example, the machine-readable link may be translated into instructions for retrieving a digital content element. Once retrieved, the content element may be provided for display on the device that scanned the link.

In some implementations, the digital content elements may be provided in an order according to an assigned weight. For example, the content associated with the highest weighted link may be displayed first and so on down. Weights may comprise static or dynamic values. For example, a geo-location weight may comprise a static value assigned to its location or a dynamic value based on the distance of the displayed link from a user. Another dynamic weight example may determine whether a category associated with a scanning user matches a category tag associated with the link. Links may also be weighted based on their inclusion in a set—scanning one link of the set may result in a second link of the same set receiving a higher weight than a link that is not part of the set. The number and frequency of scans of a link may also increase that link's overall weight relative to links that receive fewer or less frequent scans.

Method 300 may then end at stage 350.

Figure 4:
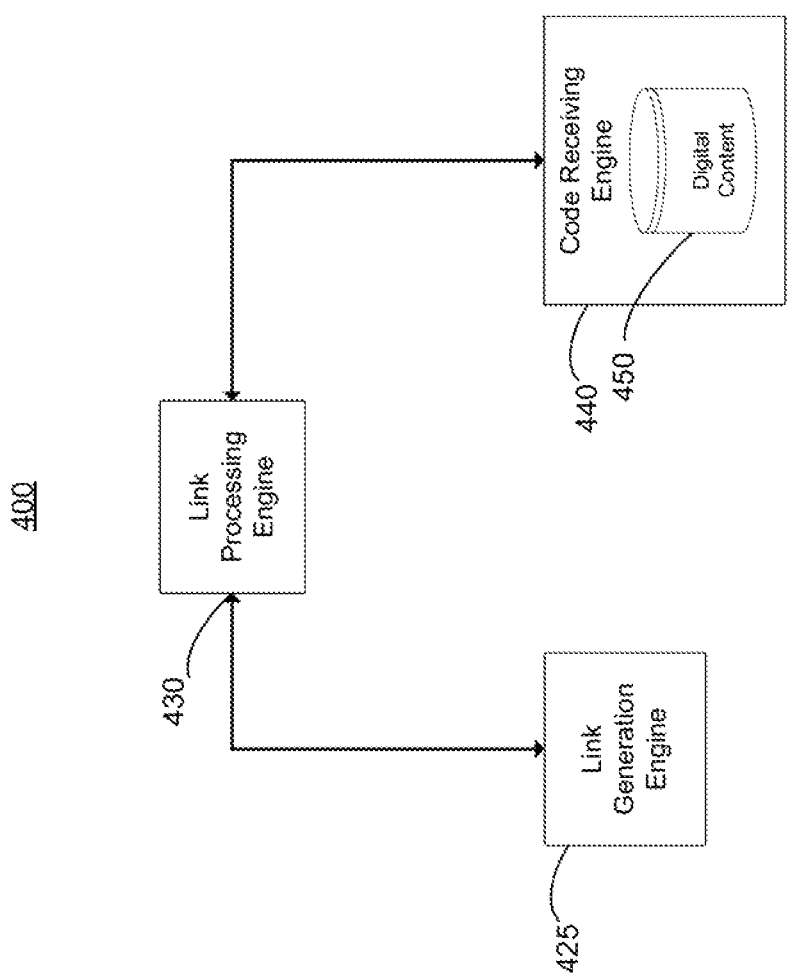
FIG. 4 is a block diagram of an example system for providing link associations.

FIG. 4 is a block diagram of an example system 400 for providing a link association. System 400 may comprise a link generation engine 425, a link processing engine 430, and a code receiving engine 440 comprising a plurality of digital content elements 450. Link generation engine 425, link processing engine 430 and code receiving engine 460 may be associated with a single computing device and/or may be communicatively coupled such as via a direct connection, bus, or network. Each of engines 425, 430, and 440 may comprise hardware and/or software associated with computing devices.

Link generation engine 425 may create a plurality of machine-readable links associated with a plurality of digital content elements, and associate a plurality of metadata with each of the plurality of machine-readable links. For example, instructions for retrieving the content element, such as a network location, may be encoded into a form that may be displayed such as in the examples of FIGS. 2A-2C. The link may be associated with parameters, such as category tags, target demographics, link sets, that may be encoded into the machine-readable link and/or may be stored in a separate database and indexed by a unique identifier encoded into the machine-readable link.

Link processing engine 430 may identify plurality of relationships among the plurality of machine-readable links according to the plurality of metadata and a plurality of usage data and assign a weight to each of the plurality of links according to the plurality of usage data. In some implementations, the relationships among the machine-readable links may be established by assigning a common tag to the first machine-readable link and the second machine-readable link, associating the first machine-readable link with the second machine-readable link, assigning a common tag to the first machine-readable link and the second machine-readable link, determining that the first machine-readable link and the second machine-readable link have been scanned within a threshold time of each other, and/or determining that the first machine-readable link and the second machine-readable link have been scanned by a plurality of users sharing a demographic characteristic.

Code receiving engine 440 may receive a request for a t digital content element of the plurality of digital content elements in response to a scan of an associated one of the plurality of machine-readable links, identify at least one second digital content element related to the first digital content element, retrieve the first and at least one second digital content elements, and provide the first and at east one second digital content elements in an order according to the weight assigned to each of the links associated with the first and at least one second digital content elements.

For example, a user device may scan the machine-readable link and decode a unique identifier of the link and a network address for the code receiving engine. The device may provide the unique identifier to the code-receiving engine 440, which may then provide the digital content element associated with the unique ID and any digital content element(s) related to that machine-readable link.

The disclosed examples may include systems, devices, computer-readable storage media, and methods, for link association. For purposes of explanation, certain examples are described with reference to the components illustrated in the Figures. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by these terms. Instead, these terms are only used to distinguish one element from another.

Further, the sequence of operations described in connection with the Figures are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. All such modifications and variations are intended to be included within the scope of this disclosure and protected by the following claims.

We claim:

1. A non-transitory machine-readable storage medium storing instructions that when executed by a processor cause the processor to:

receive scans of a first machine-readable link to a first content element and a second machine-readable link to a second content element;

determine metadata associated with the first and second machine-readable links, wherein the metadata includes time, geo-locations, and frequency of the scans of the first and second machine-readable links;

group the first machine-readable link with the second machine-readable link together based on a correlation between the time, geo-locations, and frequency of the scans of the first and second machine-readable links; and in response to an opening of a link-scanning application on a user device, retrieve and display, on the user device, the first content element and the second content element before the first and second machine-readable links being scanned by the user device, based on a proximity between the user device and the first machine-readable link.

2. The non-transitory machine-readable medium of claim 1, wherein the instructions are executable to cause the processor to group the first machine-readable link with the second machine-readable link together based on a condition in which the first content element is displayed within a threshold distance from the second content element.

3. The non-transitory machine-readable medium of claim 1, wherein the instructions are executable to cause the processor to group the first machine-readable link with the second machine-readable link based on a condition in which the first content element and the second content element are located within a same document.

4. The non-transitory machine-readable medium of claim 1, wherein the instructions are executable to cause the processor to group the first machine-readable link with the second machine-readable link based on a condition in which the first content element and the second content element have been captured by a same image capture device.

5. The non-transitory machine-readable medium of claim 1, wherein the instructions are executable to cause the processor to group the first machine-readable link with the second machine-readable link based on a condition in which the first content element and the second content element are both classified into a same category.

6. The non-transitory machine-readable medium of claim 1, wherein the instructions are executable to cause the processor to group the first machine-readable link with the second machine-readable link based on a condition in which the first content element and the second content element are associated with a same demographic category of users.

7. A computer-implemented method, comprising:
receiving, by a processor of a computing device, scans of a first machine-readable link to a first digital content element and a second machine-readable link to a second digital content element;
determining, by the processor, metadata associated with the first and second machine-readable links, wherein the metadata includes time, geo-locations, and frequency of the scans of the first and second machine-readable links;
grouping, by the processor, the first machine-readable link with the second machine-readable link together based on a correlation between the time, geo-locations, and frequency of the scans of the first and second machine-readable links; and
in response to an opening of a link-scanning application on a user device, retrieving and displaying, on the user device, by the processor, both the first digital content element of the first machine-readable link and the second digital content element of the second machine-readable link before the first and second machine-readable links being scanned by the user device, based on a proximity between the user device and the first machine-readable link.

8. The computer-implemented method of claim 7, further comprising: after grouping the first machine-readable link with the second machine-readable link together, assigning a common tag to the first machine-readable link and the second machine-readable link.

9. The computer-implemented method of claim 7, wherein grouping the first machine-readable link with the second machine-readable link together is based on a determination that the first machine-readable link and the second machine-readable link are displayed within a threshold distance from each other.

10. The computer-implemented method of claim 7, wherein grouping the first machine-readable link with the second machine-readable link together is based on a determination that the first machine-readable link and the second machine-readable link have been scanned within a threshold time of each other.

11. The computer-implemented method of claim 7, wherein grouping the first machine-readable link with the second machine-readable link together is based on a determination that the first machine-readable link and the second machine-readable link have been scanned by a plurality of users sharing a similar demographic characteristic.

12. The computer-implemented method of claim 7, further comprising assigning a weight to each of the first machine-readable link and the second machine-readable link.

13. The computer-implemented method of claim 12, further comprising displaying the first digital content element and the second digital content element on the user device in an order according to the assigned weights of the first and second machine-readable links.

14. The computer-implemented method of claim 7, further comprising:
determining whether the second machine-readable link has been scanned by a second device; and
in response to determining that the second machine-readable link has been scanned by the second device, providing the second digital content element and the first digital content element to the second device based on the grouping of the first machine-readable link and the second machine-readable link.

15. A system, comprising:
a processor; and
a memory storing instructions that when executed cause the processor to:
receive scans of a plurality of machine-readable links to a plurality of corresponding digital content elements,
determine metadata associated with each of the plurality of machine-readable links, wherein the metadata includes time, geo-locations, and frequency of the scans of the plurality of machine-readable links,
group the plurality of machine-readable links together based on a correlation between the time, geo-locations, and frequency of the scans of the plurality of machine-readable links, and
in response to an open of a link-scanning application on a user device, retrieve and display, on the user device, the plurality of digital content elements of the plurality of machine-readable links before the plurality of machine-readable links being scanned by the user device, based on a proximity between the user device and one of the plurality of machine-readable links.

16. The system of claim 15, wherein the instructions further cause the processor to:
assign a weight to each of the plurality of machine-readable links, and
display the digital content elements on the user device in an order according to the assigned weights of the plurality of machine-readable links.

17. The system of claim 15, wherein the instructions are executable to cause the processor to:
group the plurality of machine-readable links together based on a determination that the machine-readable links are displayed within a threshold distance from each other.

18. The system of claim 15, wherein the instructions are executable to cause the processor to:
group the plurality of machine-readable links together based on a determination that the plurality of machine-readable links have been scanned within a threshold time of each other.

19. The non-transitory machine-readable storage medium of claim 1, wherein the instructions are executable to cause the processor to:
assign a weight to each of the first and second machine-readable links; and
display the first and second content elements on the user device in an order according to the assigned weights of the first and second machine-readable links.

20. The non-transitory machine-readable storage medium of claim 1, wherein, for the proximity between the user device and the first machine-readable link, the instructions are executable to cause the processor to display the first and second content elements on the user device before the first and second machine-readable links being scanned by the user device in response to a detection that the user device is geographically located at a location where the first machine-readable link is displayed.

\* \* \* \* \*